(No Model.)

W. B. ARNOLD.
WAXED END OR THREAD.

No. 351,683. Patented Oct. 26, 1886.

Witnesses
S. N. Piper.
W. B. Torrey.

Inventor,
William B. Arnold,
by R. H. Eddy atty.

UNITED STATES PATENT OFFICE.

WILLIAM BENNETT ARNOLD, OF NORTH ABINGTON, MASSACHUSETTS.

WAXED END OR THREAD.

SPECIFICATION forming part of Letters Patent No. 351,683, dated October 26, 1886.

Application filed August 16, 1886. Serial No. 210,982. (No specimens.)

*To all whom it may concern:*

Be it known that I, WILLIAM BENNETT ARNOLD, of North Abington, in the county of Plymouth, of the Commonwealth of Massachusetts, have invented a new and useful Improvement in the Manufacture of Waxed Ends or Threads for the Use of Cordwainers or Harness-Makers or others; and I do hereby declare the same to be described in the following specification, and represented in the accompanying drawings, of which—

Figure 1:
Figure 2:

Figure 1 is a side view of a piece of waxed end or thread of my improved kind. Fig. 2 is a side view of a piece of its wire.

My present invention has reference to the waxed ends or thread described and represented in the United States Patents Nos. 342,679 and 342,725, one of said patents being on an invention by Edward I. Brown, and the other on one by myself. Each of the "waxed ends" or thread described in the said patents consisted of a thread or yarn of flax, silk, or other suitable vegetable or animal material and one or more metallic wires twisted together, and having upon them a covering of shoe-maker's wax. In using such a waxed thread in a "McKay sewing-machine" it has been found in practice that, owing to the stretching of the vegetable part of it while being pulled through the work by the hooked needle, the wire or wires become subjected to undue strain, so much so as to occasionally, if not frequently, break asunder. In order to overcome this difficulty, I corrugate each wire before it is twisted into the vegetable or animal part, or strand or strands, the same being so as to enable the wire to stretch with the vegetable or animal strand or strands when the waxed thread is being used as mentioned, and with such to bear the strain without breaking.

In Fig. 1 of the drawings the new compound waxed thread is shown at A, its string of flax, hemp, or silk at *a*, the wire or wires at *b*, and the waxen covering at *c*, each wire, before being intertwisted with the strand or strands of vegetable or animal material, being corrugated, as shown in Fig. 2.

I do not claim a sewing-thread composed of shoe-maker's wax, one or more straight or uncorrugated wires, and one or more strands of flax, or a vegetable or animal material; but

I claim—

1. The improved manufacture of waxed sewing-thread, substantially as described, composed of one or more corrugated metallic wire or wires and one or more strands of flax or a fibrous vegetable or animal material intertwisted, and a covering of shoe-maker's wax applied thereto, all being for use as set forth.

2. A sewing-thread composed of one or more corrugated metallic wire or wires and one or more strands of flax or a fibrous vegetable or animal material intertwisted together, all essentially as set forth.

WILLIAM BENNETT ARNOLD.

Witnesses:
R. H. EDDY,
R. B. TORREY.